US010462364B2

(12) United States Patent
Russi-Vigoya et al.

(10) Patent No.: US 10,462,364 B2
(45) Date of Patent: Oct. 29, 2019

(54) ELECTRONIC DEVICES HAVING MULTIPLE POSITION CAMERAS

(71) Applicant: HEWLETT-PACKARD DEVELOPMENT COMPANY, L.P., Houston, TX (US)

(72) Inventors: Maria Natalia Russi-Vigoya, Houston, TX (US); Michael C. Bartha, Houston, TX (US); Dimitre Mehandjiysky, Houston, TX (US); Zheng Cao, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/079,137

(22) PCT Filed: Oct. 25, 2016

(86) PCT No.: PCT/US2016/058679
§ 371 (c)(1),
(2) Date: Aug. 23, 2018

(87) PCT Pub. No.: WO2018/080455
PCT Pub. Date: May 3, 2018

(65) Prior Publication Data
US 2019/0058828 A1    Feb. 21, 2019

(51) Int. Cl.
*H04N 5/232*    (2006.01)
*H04N 5/225*    (2006.01)

(52) U.S. Cl.
CPC ..... *H04N 5/23238* (2013.01); *H04N 5/23299* (2018.08); *H04N 5/232935* (2018.08); *H04N 5/2252* (2013.01); *H04N 5/2253* (2013.01)

(58) Field of Classification Search
None
See application file for complete search history.

(56) References Cited

U.S. PATENT DOCUMENTS

| 9,363,569 | B1 | 6/2016 | Van Hoff et al. |
| 2010/0097442 | A1* | 4/2010 | Lablans ............ G03B 5/00 |
| | | | 348/36 |
| 2012/0002004 | A1 | 1/2012 | Free |
| 2013/0141524 | A1 | 6/2013 | Karunamuni et al. |

(Continued)

FOREIGN PATENT DOCUMENTS

CN    203745784 U    7/2014

OTHER PUBLICATIONS

Lien, "360-degree Camera Makers Are Focusing on the Consumer Market", Retrieved from Internet: http://phys.org/news/2015-09-degree-camera-makers-focusing-consumer.html, Sep. 28, 2015, 4 pages.

(Continued)

*Primary Examiner* — Eileen M Adams
(74) *Attorney, Agent, or Firm* — Trop, Pruner & Hu P.C.

(57) ABSTRACT

A technique includes selecting at least one boundary for a panoramic image to be captured by a camera of an electronic device. The technique includes, based at least in part on the at least one selected boundary, moving the camera relative to a housing of the electronic device to acquire data representing a plurality of images that are associated with different imaged areas; and processing the acquired data to construct the panoramic image.

20 Claims, 11 Drawing Sheets

(56) References Cited

U.S. PATENT DOCUMENTS

| | | |
|---|---|---|
| 2013/0321581 A1* | 12/2013 | El-Ghoroury .......... H04N 5/225 348/46 |
| 2014/0282051 A1* | 9/2014 | Cruz-Hernandez ......................... G06F 3/0414 715/744 |
| 2015/0138314 A1 | 5/2015 | Vincent |
| 2017/0034431 A1* | 2/2017 | Malgimani ........ H04N 5/23222 |

OTHER PUBLICATIONS

Jones, "Dual-Camera 360 Panorama Application", Intel, Retrieved from Internet: https://software.intel.com/en-us/articles/dual-camera-360-panorama-application, Nov. 11, 2013, 4 pages.

Owano, "Ricoh Shows Off Omnidirectional Camera (w/ Video)", Retrieved from Internet: http://phys.org/news/2013-02-ricoh-omnidirectional-camera-video.html#nRIv, Feb. 6, 2013, 3 pages.

\* cited by examiner

ELECTRONIC DEVICES HAVING MULTIPLE POSITION CAMERAS

BACKGROUND

An electronic device, such as a smartphone, may have one or multiple cameras for purposes of acquiring still images or video. For example, a smartphone may have cameras on its front and rear faces. One of the cameras may be active at a given time, and a display of the smartphone may serve as a viewfinder for the active camera.

DETAILED DESCRIPTION

Figure 1A:
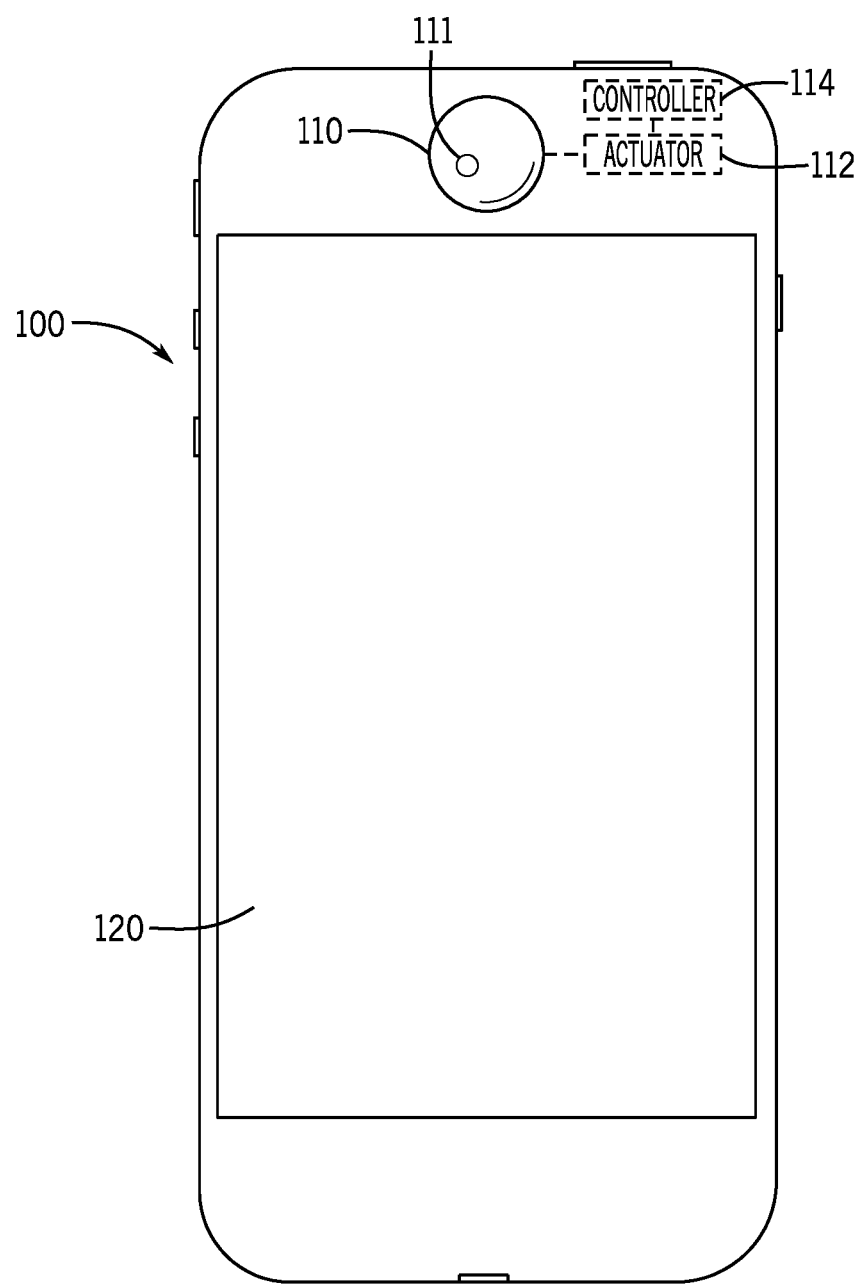
FIG. 1 is a front view of an electronic device having a multiple position camera according to an example implementation.
FIG. 1B is a rear view of the electronic device of FIG. 1A according to an example implementation.

In accordance with example implementations that are described herein, an electronic device includes a multiple position camera, which emulates the movement of the human eye to dynamically acquire a plurality of images (also called "snapshots" and "pictures" herein) at multiple camera positions without the user physically moving the electronic device. More specifically, in accordance with example implementations, the camera is attached to a housing of the electronic device using a mount, which allows an actuator of the camera to dynamically position the camera as the camera acquires images. In this manner, in accordance with an example implementation, the camera may be positioned over an azimuthal angle range of up to 180 degrees and a polar angle range up to 180 degrees with respect to the housing of the electronic device.

The multiple position camera may be beneficial for various modes of operation of the electronic device. For example, in a panoramic snapshot acquisition mode of operation, the multiple position camera may acquire image data for a panoramic snapshot (i.e., an image that spans beyond the field of vision of the camera) without the user of the electronic device physically moving the electronic device. In this context, a "panoramic snapshot" or "panoramic image" refers to an image that extends in at least one dimension beyond the camera's field of vision and is generated by the camera by combining, or "stitching" together images that are captured at multiple camera positions. For example, the width of the panoramic snapshot may exceed the width of the camera's field of vision, and accordingly, the camera may be moved in a left-to-right direction or in a right-to-left direction to acquire multiple images that span the width of the panoramic snapshot. As other examples, the panoramic snapshot may have a height that exceeds the height of the camera's field of vision or may have both a width and a height that exceed the corresponding dimensions of the camera's field of vision.

The dynamic positioning and image capturing by multiple position camera in connection with acquiring images for a panoramic snapshot eliminates human error and/or uncertainty associated with the rate at which a human may otherwise move the electronic device (for a fixed position camera) to acquire image data for the panoramic snapshot.

The multiple position camera may also be used in a successive snapshot acquisition mode of operation (as called a "burst" mode of operation) in which the electronic device may be programmed so that the multiple position camera captures multiple images at multiple positions in a "burst," i.e., the camera captures the images or snapshots at different locations in rapid time succession, such that the snapshots are acquired one after another in a relatively short period of time. In this manner, the electronic device may be programmed with a user-defined pattern of target positions for acquiring multiple images at successive times without the user moving the electronic device.

Although a person may move an electronic device that contains a fixed position camera for purposes of taking successive sequential snapshots, moving the electronic device to aim the camera at one point and then another while taking successive snapshots may adversely affect the snapshot quality. Moreover, it may be difficult for a human to multitask by, for example, looking for a snapshot to be captured, capturing the snapshot relatively quickly and then repeating the process multiple times to acquire other snapshots. This may be particularly challenging when the user is actively paying attention to an event (a sporting event, for example). Thus, the use of the multiple position camera and the successive snapshot acquisition mode of operation means that the user of the electronic device may rapidly acquire successive snapshots at different locations without moving.

The multiple position camera may also be used in a single snapshot capture mode of operation of the electronic device in which the multiple position camera captures a snapshot at an angle that is pre-selected by the user so that the user does not otherwise assume an awkward posture (raising the electronic device over the user's head, turning sideways, and so forth) to capture the snapshot. Moreover, because the user may capture snapshots in the single snapshot capture mode of operation or in any of the other modes of operation without physically moving the electronic device or assuming a posture identifiable with picture taking, the snapshots may be captured without raising awareness of the picture taking activity.

Referring to FIG. 1A, as a more specific example, in accordance with some implementations, the portable electronic device may be a smartphone, such as an example smartphone 100 that is depicted in FIG. 1A. It is noted that other electronic devices, both portable and otherwise, may contain a multiple position camera, in accordance with further example implementations, such as a tablet, a convertible, a laptop, an unmanned aircraft (or "drone"), a wearable electronic device, a medical device, or in general, any electronic device that may be used to take or capture still images (or snapshots or photographs) or video images.

In accordance with example implementations, the electronic device 100 includes one or multiple, multiple position cameras, such as a multiple position camera 110 that is disposed on the front face of the electronic device 100 (the face of the electronic device 100 containing a visual display 120, such as a touch screen) and a multiple position camera 122 (FIG. 1B) that is disposed on the rear face of the electronic device 100 (i.e., the camera 122 is disposed on the face of the electronic device 100 opposite the display 120). Referring to FIG. 1A, the camera 110, for this example implementation, is disposed above the visual display 120 of the electronic device 100. Thus, depending on the particle implementation, the electronic device 100 may have a single, multiple position camera on its front or rear face, or may have a multiple position camera on its front face and a multiple position camera on its rear face. In accordance with further example implementations, the electronic device 100 may have more than two multiple position cameras; may have one or multiple, multiple position cameras, along with one or multiple fixed position cameras; and so forth.

In accordance with example implementations in which the electronic device 100 has dual cameras, the electronic device 100 may be configured (via user selection, for example) to have one of two camera modes of operation: a user facing mode or a world facing mode. For the user facing camera mode, the display screen 120 displays a viewfinder image for the camera 110 as the display and the camera 110 acquires images directed toward the user (i.e., projecting outwardly from the display screen 120). For the world facing mode, the rear facing camera 122 acquires images directed away from the rear face of the electronic device 100, and the display screen 120 displays a viewfinder image for the camera 122.

In either the user or world facing camera modes, the display 122 may display still or video images that are acquired by one its cameras. In this context, a "snapshot," "image" or "photograph" that is acquired or captured by a camera refers to a still image acquired due to a single camera shot, an image that coincides with a video frame, an image acquired as part of a multiple set of images acquired, a derived or constructed panoramic image, an image captured as part of a predetermined pattern of images taken at different camera locations, and so forth. Moreover, acquiring or capturing an image, snapshot or photograph refers to an imager (an imaging array of the camera, for example) acquiring data, which represents the image, snapshot or photograph.

In the following example implementations, it is assumed that the electronic device 100 is in the world facing camera mode of operation, with the rear facing camera 122 capturing images and the visual display 120 displaying the images that are acquired by the rear facing camera 122. It is noted that, however, in accordance with further implementations, the electronic device 100 may be placed in a user facing camera mode of operation, with the systems and techniques that are described herein being applicable to the front facing camera 110 and the images acquired by the camera 110.

Figure 1B:
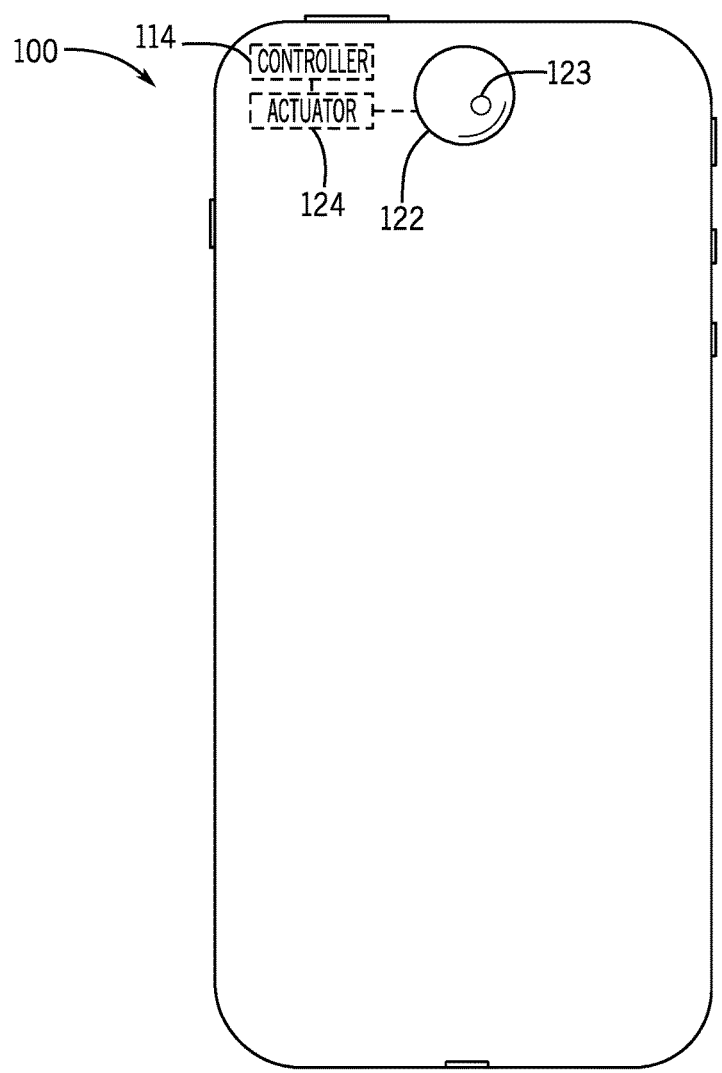
Figure 2:
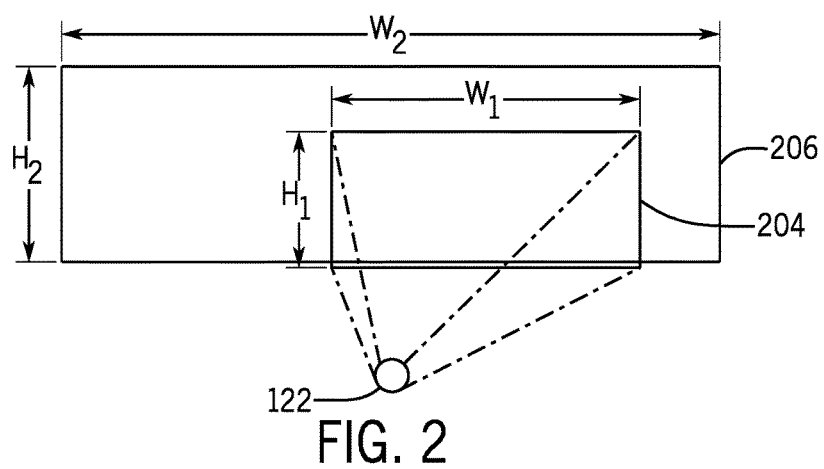
FIG. 2 is an illustration of a field of vision of the camera of FIG. 1A and an effective field of vision obtained through the dynamic positioning of the camera during image acquisition according to an example implementation.

Referring to FIG. 2 in conjunction with FIG. 1B, the camera 122 may have a field of vision 204 that may be generally characterized as having an associated height $H_1$ and an associated width $W_1$. The user, however, may desire to capture a larger image (a panoramic image or snapshot, for example), which is associated with a larger field of vision 206 that may be characterized by a width $W_2$ and a height $H_2$. As depicted in the example for FIG. 2, at least one of the height $H_2$ and width $W_2$ of the field of vision 206 may exceed the corresponding dimension of the camera's field of vision 204. As such, for purposes of acquiring the larger image, the electronic device 100, in the panoramic snapshot acquisition mode of operation, positions the camera 122 at multiple locations, the camera 122 captures images at these locations, and the electronic device 100 combines, or stitches, the multiple images together to form a larger composite, panoramic image. It is noted that the images that are captured by the camera 122 may be overlapping images (i.e., images overlapping in one or multiple dimensions), in accordance with example implementations.

For purposes of moving the camera 122, the electronic device 100 may include an actuator 124 (See FIG. 1B), which is constructed to exert a force (or forces) on the camera 122 to rotatably position the camera 122 about one or multiple axes (as controlled by the camera's mount), in response to one or multiple control signals that are provided by a controller 114. The controller 114 may also control when the camera 122 acquires images. In this manner, for purposes of dynamically positioning the camera 122 and acquiring multiple images, the controller 114 may cause the actuator 124 to move the camera 122 to a first predetermined position, cause the camera 122 to capture an image at the first predetermined position, cause the actuator 124 to move the camera 122 to a second predetermined position, cause the camera 122 to capture another image, and so forth.

In accordance with example implementations, the controller 114 may, prior to the taking of the images for a panoramic snapshot, receive user input to define the boundaries of the range over which the camera moves and captures images. Moreover, the controller 114 may further receive user input that defines the number of images to capture during the dynamic positioning and image acquisition, or in accordance with further example implementations, the controller 114 may determine the number of images to acquire based at on the user-defined range. The controller 114 may further determine positions at which the images are to be acquired as the camera 122 moves over the user-defined range. The controller 114 may then (in response to the user pressing a snapshot "button", for example) operate the actuator 112 to move the camera 122 and capture images at the predetermined positions.

Figure 3:
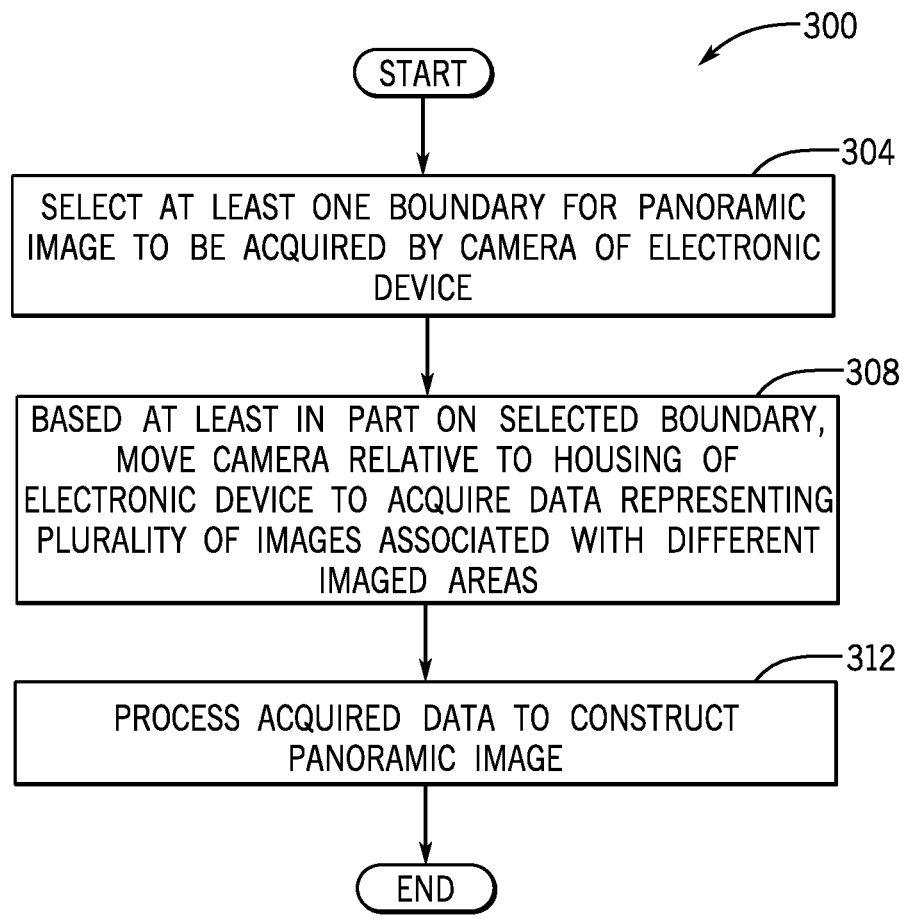
FIG. 3 is a flow diagram depicting a technique to generate a panoramic image according to an example implementation.

Thus, referring to FIG. 3, in accordance with example implementations, a technique 300 includes selecting (block 304) at least one boundary for a panoramic image to be acquired by a camera of an electronic device and, based at least in part on the identified boundary(ies), moving (block 308) the camera relative to a housing of the electronic device to acquire data representing a plurality of images that are associated with different imaged areas. The technique 300 includes processing (block 312) the acquired data to construct the panoramic image.

Figure 4:
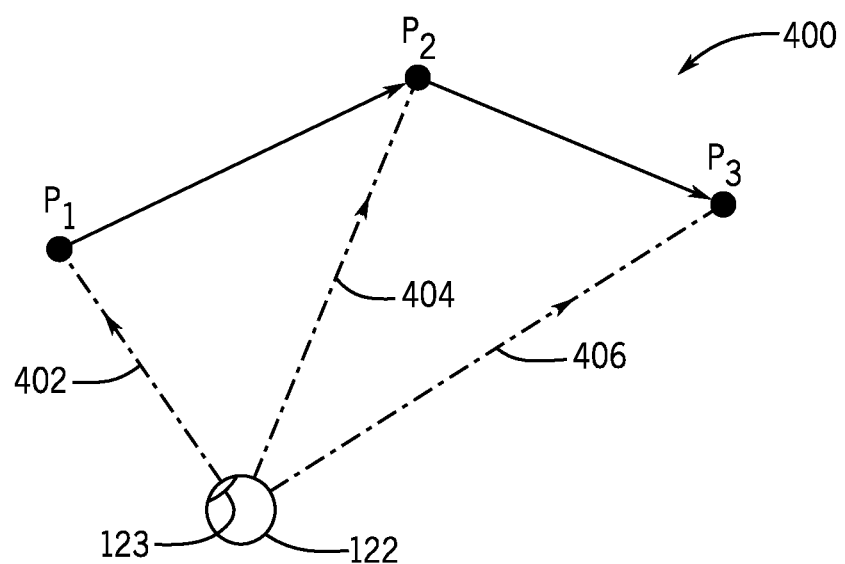
FIG. 4 is an illustration of a user-defined predetermined pattern for acquiring images by a multiple position camera according to an example implementation.

In accordance with further example implementations, the electronic device 100 may operate in a successive snapshot acquisition mode of operation to acquire snapshots at user-defined camera positions. In this manner, instead of defining the range over which the camera 122 moves, the user may provide input selecting positions at which the camera 122 is to acquire images. In this manner, as depicted in FIG. 4 in an illustration 400, several camera target locations, or positions $P_1$, $P_2$ and $P_3$, may be preselected by the user (via one or more input devices of the electronic device 100), and the controller 114 may thereafter control the position of the camera 122 for purposes of capturing images at the selected target positions. FIG. 4 illustrates the dynamic positioning of the camera 122. In particular, FIG. 4 depicts a lens 123 of the camera 122 being oriented to such that an optical axis of the camera 122 is aligned in a direction 402 toward position P1. After acquiring the image associated with position P1, the controller 114 may then reposition the camera 122 so that the optical axis of the camera 122 is aligned with a direction 404 toward position P2. Subsequently, after acquiring the image associated with position P2, the controller 114 may reposition the camera 122 so that the optical axis of the camera 122 is aligned in a direction 406 toward position P3, where another image is acquired.

Figure 5A:
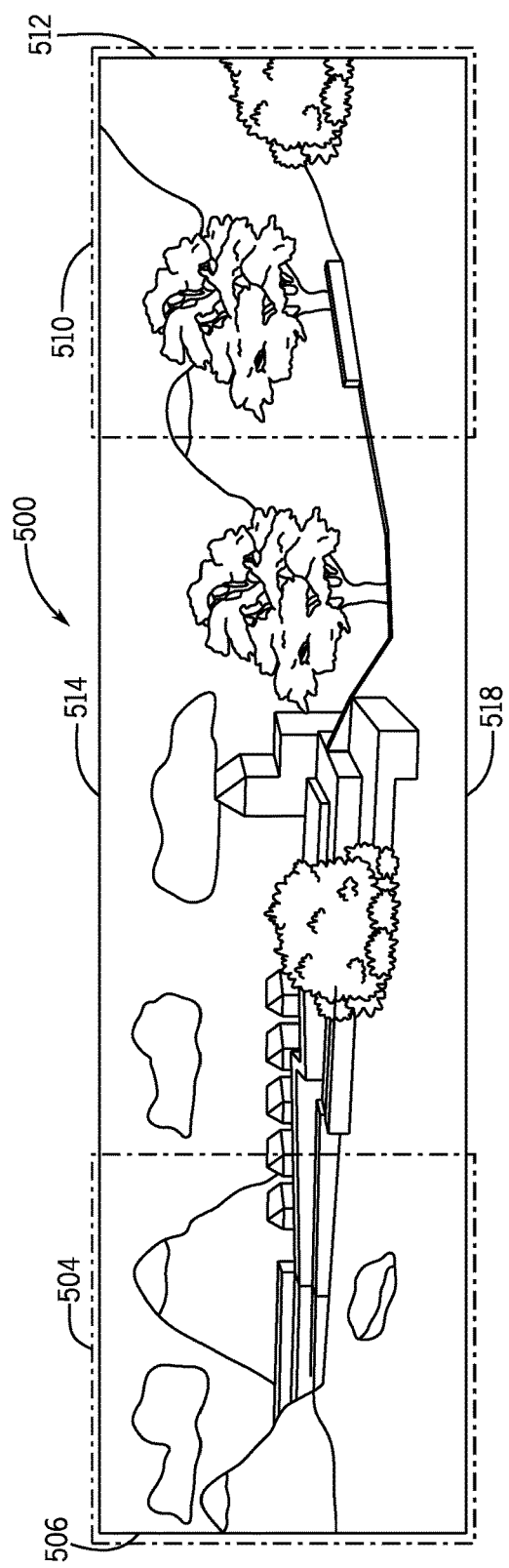
FIG. 5A is an example of a panoramic image acquired by a multiple position camera according to an example implementation.
Figure 5B:
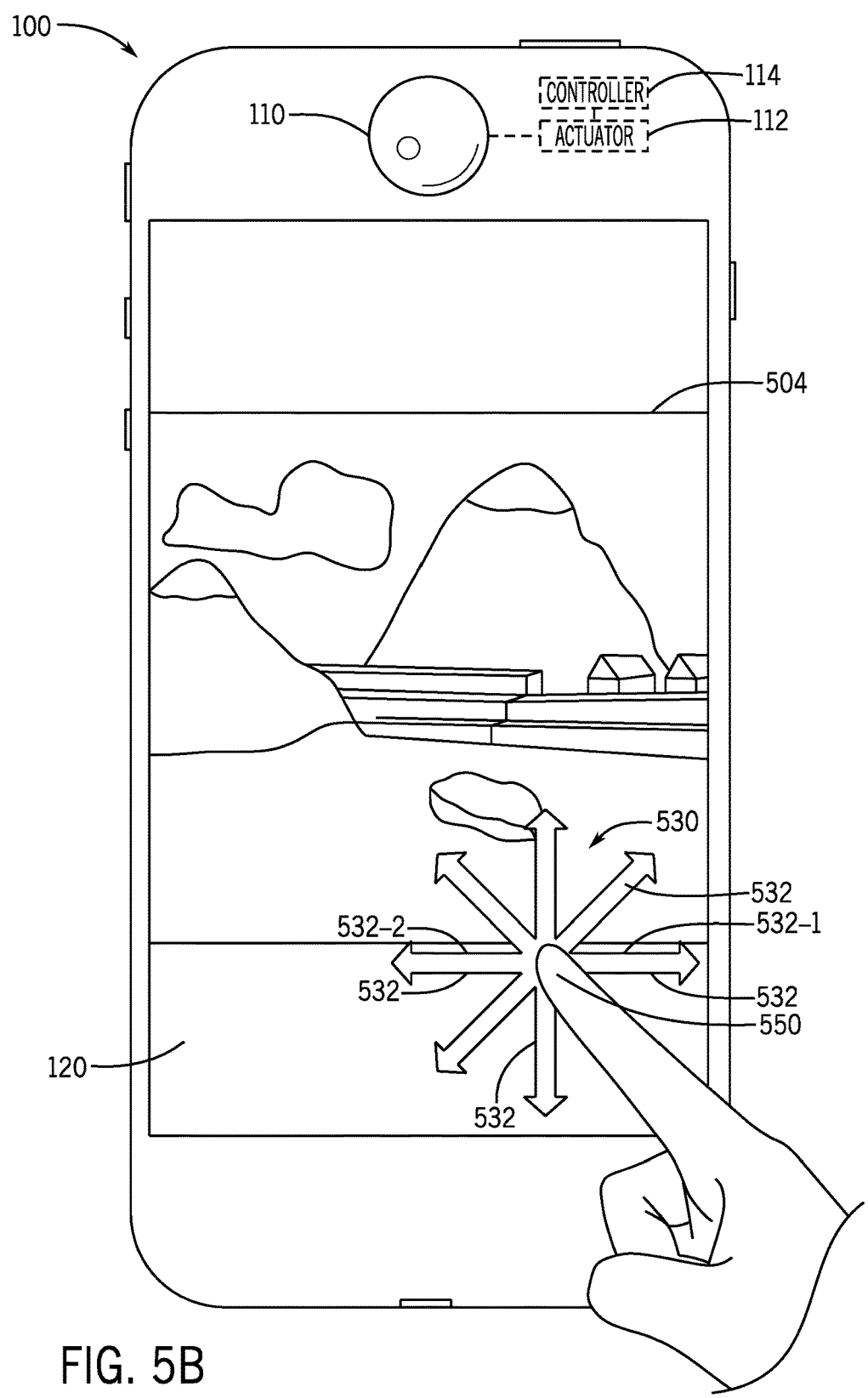
FIG. 5B is a front view of an electronic device illustrating selection of a left boundary of the panoramic image of FIG. 5A according to an example implementation.
Figure 5C:
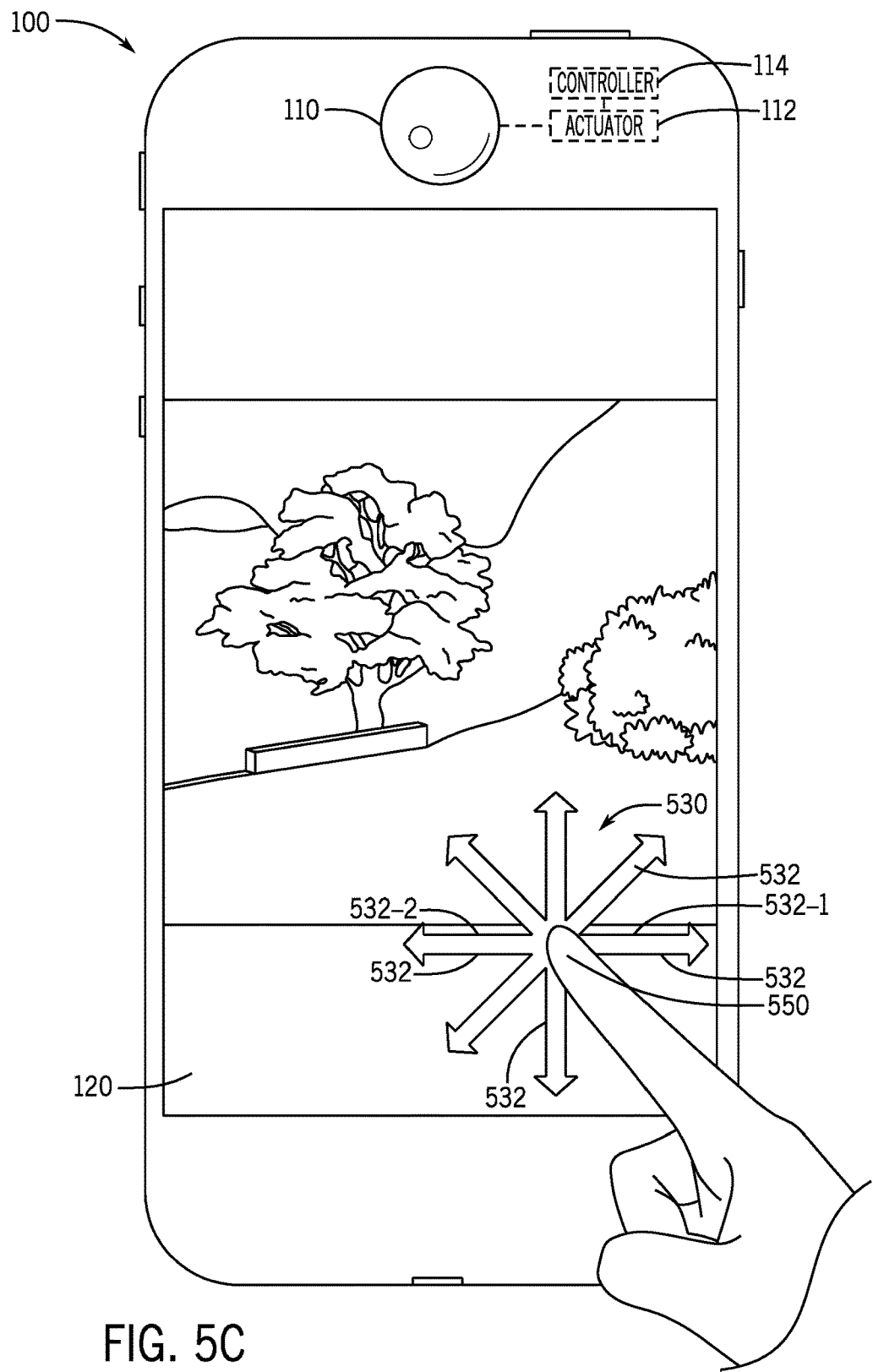
FIG. 5C is a front view of the electronic device illustrating selection of the right boundary of the panoramic image of FIG. 5A according to an example implementation.

FIG. 5A depicts an example scene 500 to be acquired by the electronic device 100 for the panoramic snapshot acquisition mode of operation. For this example, the scene 500 corresponds to a panoramic snapshot, as the field of vision that is associated with the scene 500 exceeds the field of vision of the camera 122 in at least one dimension. FIGS. 5B and 5C illustrate how the user may select boundaries for the panoramic snapshot. In particular, in accordance with example implementations, FIGS. 5B and 5C illustrate how the user may provide input to the electronic device 100 using a graphical user interface (GUI) of the device 100 for purposes of defining the boundaries of the panoramic snapshot. More specifically, referring to FIG. 5B, in accordance with an example implementation, a GUI for the electronic device 100 displays an overlay image 530 on top of a current viewfinder image for the camera 122. The overlay image 530 for this example implementation has directional arrows 532 that may be used, as described herein, to move the camera 122 (via the actuator 124) for purposes of allowing the user to select the boundaries of the panoramic snapshot.

For the example scenario that is depicted in FIG. 5B, the display 120 shows a viewfinder image that corresponds to the left hand portion 504 of the scene 500 in FIG. 5A, and the left side of the image position corresponds to the left boundary 506 of the scene 500. The user may, through touch gestures (as an example), interact with the GUI along directional arrows 532 of the overlay image 530 for purposes of panning, or moving, the camera 110 to acquire a different viewfinder image. For example, the user may, through a swiping left-to-right touch gesture by the user's finger 550 in the direction of the arrow 532-1, cause the camera 122 to pan left until the left edge of the displayed viewfinder image corresponds to the left boundary 506 of the panoramic image 506, as depicted in FIG. 5B. When the displayed viewfinder image corresponds to a boundary for the panoramic snapshot to be acquired, the user may then, for example, interact with the GUI (tap on the display 120, for example) for purposes of indicating selection of a boundary for the panoramic snapshot.

Other boundaries of the panoramic snapshot may be selected in a similar manner. For example, the user may, via the arrows 532, pan, or move, the camera 122 so that the camera 122 pans (as shown in the viewfinder image) to another boundary of the panoramic image 500. For example, the user may pan the camera 122 right using a right-to-left swiping touch gesture in the direction of the arrow 532-2 until the viewfinder image on the display 120 corresponds to the right boundary edge 510 (FIG. 5A) of the panoramic image 500 to be acquired, as depicted in FIG. 5C. In this manner, the right edge of the displayed viewfinder image in FIG. 5C corresponds to the right boundary 512 (FIG. 5A) of the panoramic snapshot to be acquired. The user may then interact with the GUI (tap on the display 120, for example) to indicate the selection of the boundary (the right boundary 512 for this example). In a similar manner, the user may select upper and lower boundaries of the panoramic image 500 if the panoramic image vertically exceeds the camera's field of vision.

The GUI may provide other features for the user and may provide other ways to select the boundaries of the panoramic snapshot or image to be acquired, in accordance with further example implementations. For example, in accordance with some implementations, the GUI may display a viewfinder image, which itself may be a panoramic image that is constructed by the electronic device causing the multiple position camera 122 to move about one or multiple axes, acquire snapshots at the corresponding multiple positions, and stitch together the snapshots to form the viewfinder image. The viewfinder image may be a maximum-sized viewfinder image (a panoramic image corresponding to the full, effective field of vision of the multiple position camera), an image corresponding to the field of vision of the camera 122 in a single position, or an image sized somewhere in between. The GUI may display a boundary frame, or box, on the viewfinder image, and the user may selectively size and/or move the boundary box to select a portion of the viewfinder image for the panoramic snapshot. In this manner, the user may preview a version of the panoramic snapshot before depressing a button of the GUI to initiate capture of the panoramic image.

Moreover, in accordance with some implementations, the GUI may display an arrow, informing the user of a potential direction in which the boundary box may be moved off screen to capture a different portion of the panoramic image. In accordance with some implementations, the boundary box may highlight a particular portion of the panoramic image to be acquired, allowing the user to select one or more boundaries of the panoramic image. In accordance with some implementations, the GUI may detect the user touching the boundary box for at least a predetermined duration (a duration of three seconds, for example), so that after the GUI detects the user touching or holding the boundary box for at least this duration, the GUI may change the color of the box and/or arrow to represent that box has been used to select corresponding boundaries for the panoramic snapshot. Moreover, in accordance with some implementations, the GUI may provide haptic feedback when the user taps and moves the boundary box. The boundary box may also provide user feedback about what has been captured in the panoramic snapshot so far as the camera moves and acquires snapshots.

In accordance with example implementations, the GUI may allow a user to preselect the center of the panoramic picture with a tapping gesture on the display where the user wants the center. The GUI may also allow the user to use one or multiple other touch gestures (tap, double tap, drag, pinch, spread and rotate touch gestures, as examples) to manipulate the position of the boundary box and/or resize the box. In general, in accordance with example implementations, the boundary box may allow the user to preselect the panoramic snapshot or preview the snapshot before taking it; may provide orthogonal guidance for acquiring the panoramic snapshot; and may allow through the widening or movement of the boundary box the cropping of sections that the user does not want to include in the picture. The GUI, in accordance with example implementations, may also allow the user to adjust the boundary box so that the panoramic snapshot is set to a higher or lower angle.

In accordance with example implementations, the electronic device 100 may contain a GUI that provides an overlay image similar to or the same as the overlay image 530, for purpose of allowing a user to supply input to identify specific positions at which the camera 122 acquires images for the successive snapshot acquisition mode of operation.

In accordance with further example implementations, for purposes of allowing a user to identify pre-selected locations at which the snapshots or images are to be acquired during the successive snapshot acquisition mode of operation, a GUI of the electronic device 100 may, for example, display a viewfinder image from which the user may pre-select portions of the viewfinder image. In this manner, by selecting the portions of the viewfinder image, the user also selects locations at which the camera 122 acquires the snapshots. For example, the viewfinder image may be the image of a football field, as seen through a spectator's smartphone camera. The user may, for example, tap on the display screen of the smartphone for purposes of selecting portions of the image of the football field, as seen in the viewfinder image. These selected image portions may be, for this example, images of different parts of the football field.

In accordance with example implementations, the GUI may display (below the viewfinder image, for example) the selection image portions as thumbnail images (i.e., smaller images) to allow the user to preview of each of the selected positions. Moreover, in accordance with some implementations, the GUI may, in response to the user selecting one of the thumbnail images (through a touch gesture, for example), enlarge the thumbnail image. The GUI may also provide feedback showing (through the thumbnail images) how many target locations have been selected and how many are available to be selected (via blank thumbnail images, for example). Moreover, in accordance with some implementations, the GUI may allow the user to, through touch gestures, edit the thumbnail and/or viewfinder image size, replace a given thumbnail image (to correspondingly select another target location), and so forth. Additionally, in accordance with some implementations, the GUI may allow the user to save individual thumbnail images.

In accordance with some implementations, the electronic device 100 may contain an engine that tracks objects associated with the thumbnail images. For example, in accordance with some implementations, the engine may perform facial recognition and/or eye tracking to track one or multiple persons in a given thumbnail image. Therefore, in accordance with some implementations, in response to a person in the thumbnail image moving, for example, the engine may acquire time successive snapshots of the person (at different locations) as the person moves.

In accordance with example implementations, the electronic device 100 may provide a GUI that provides an overlay image similar to or the same as the overlay image 530 to receive input to define a snapshot capture angle for the single snapshot acquisition mode of operation. In this manner, in accordance with example implementations, the GUI may display a viewfinder image, which itself may be a panoramic image, i.e., an image constructed by the electronic device causing the camera to move over one or multiple axes to acquire images. The panoramic image may be a maximum size panoramic image, i.e., the maximum size may be displayed by the GUI, or a smaller, panoramic image. When displaying a smaller panoramic image, the GUI may display, for example, a directional control button for purposes of allowing the user to move a particular boundary of the displayed panoramic image, increase a width or height of the displayed panoramic image, and so forth. Moreover, in accordance with some implementations, the GUI may display one or multiple directional arrows at boundaries of the displayed panoramic image for purposes of indicating to the user that the displayed panoramic image may be moved in a particular direction. Moreover, in accordance with some implementations, the GUI may display a "maximum" button to allow the user to select the button to obtain the maximum possible panoramic view. Moreover, the GUI may display other features, such as features informing the user about the photograph size versus the available storage space on the electronic device. Therefore, by moving the displayed panoramic image, the user may select a snapshot capture angle for the single snapshot acquisition mode of operation. Thus, the user may be able to drag, crop, modify and set the frames for image capture with touch gestures (as an example) before the user depresses a button to acquire the snapshot.

Figure 6:
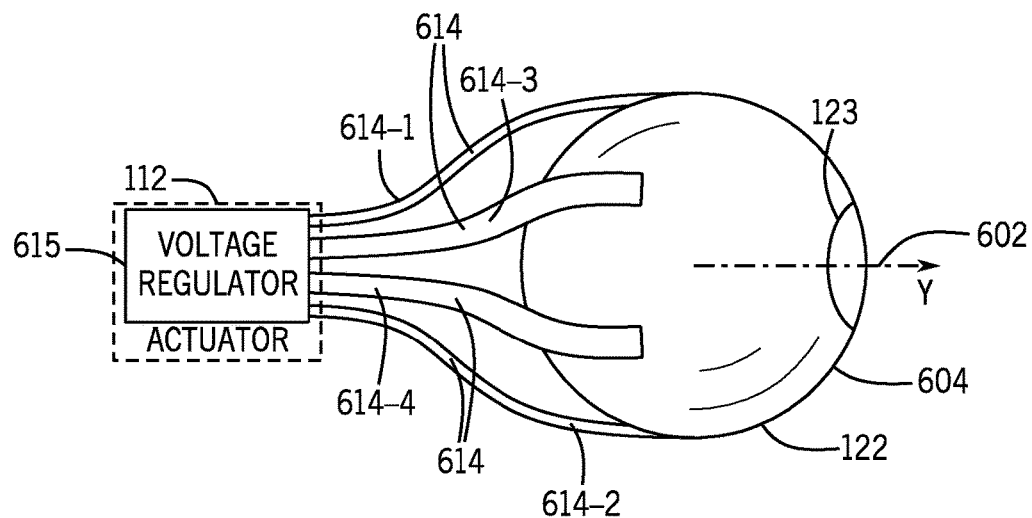
FIGS. 6 and 7 are perspective views of systems for controlling movement of a multiple position camera according to example implementations.

Referring to FIG. 6, in accordance with example implementations, the camera 122 may include a sphere-shaped body 604 (a plastic body, for example), and the camera 122 may have an optical axis 602, which is aligned with the lens, or optics 123, of the camera 122, as depicted in FIG. 6. In accordance with some implementations, the controller 114 (FIG. 2) may provide signals (voltages produced by a voltage regulator 615, for example) to control the currents in electroactive polymer elements 614 (here, the actuator 124 (FIG. 2)) that are attached to the body 604 for purposes of moving the body 604 to a selected camera position. In this manner, in accordance with example implementations, the camera 122 may have at least two electroactive polymer elements 614 (four electroactive polymer elements 614-1, 614-2, 614-3 and 614-4 being depicted in FIG. 6) that are disposed on opposite sides of a given axis about which the body 604 pivots. By controlling the currents in the members 614, the controller 114 may correspondingly control the position of the camera's optical axis 602, i.e., control the direction in which the camera acquires an image.

Although not depicted in FIG. 6, the camera 122 may, in accordance with example implementations, contain an imager within the body 604, electronics to control the image capture and readout of data from the imager and wires that extend from the body 604 to other circuitry of the electronic device 100.

In accordance with further example implementations, the electroactive polymer elements 614 may be replaced with, for example, gears that are driven by motors (here the actuator 124) to apply forces to predetermined parts of the body 604 for purposes of rotating and/or positioning the body 604; pulleys that are operated by motors for purposes of retracting and unreeling members connected to the body 604 for purposes of controlling the body's position; tracks; or other such mechanisms.

Figure 7:
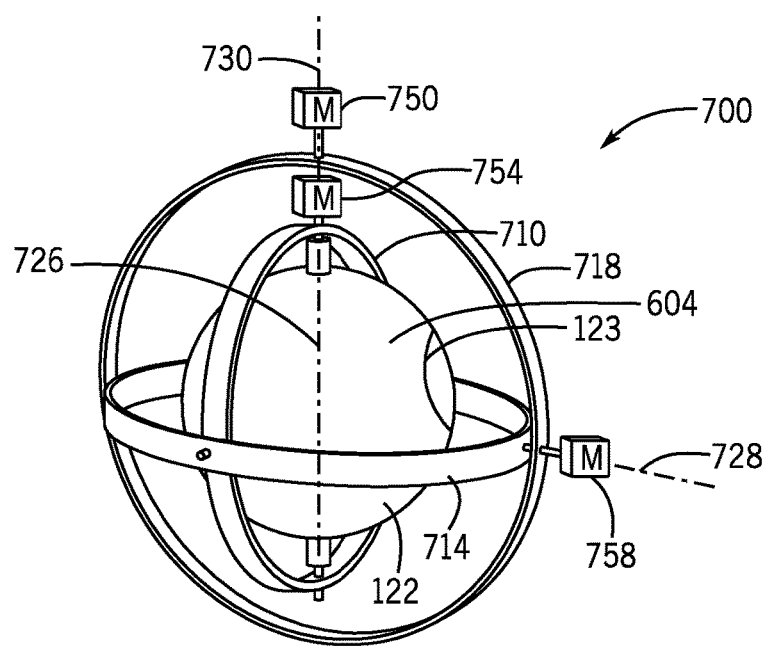

Referring to FIG. 7, in accordance with an example implementation, the body 604 may be mounted in a three axis gimbal mount 700. The gimbal mount 700 includes three gimbals 710, 714 and 718, which are constructed to pivot, or rotate, about corresponding orthogonal axes 726, 728 and 730, respectively, as controlled by electrical linear stepper motors 754, 758 and 750, respectively.

Other implementations are contemplated for actuating and mounting the camera, in accordance with further example implementations. For example, in accordance with further example implementations, the body 604 may be mounted in a synovial joint or may be positioned as part of a jointed mechanical arm. As another example, the body 604 may be mounted to move along a curved track. As another example, in accordance with further implementations, the body 604 may contain magnets so that an electromagnetic field that is controlled by currents in surrounding electrical windings may be regulate to controllably position the body 604.

Figure 8:
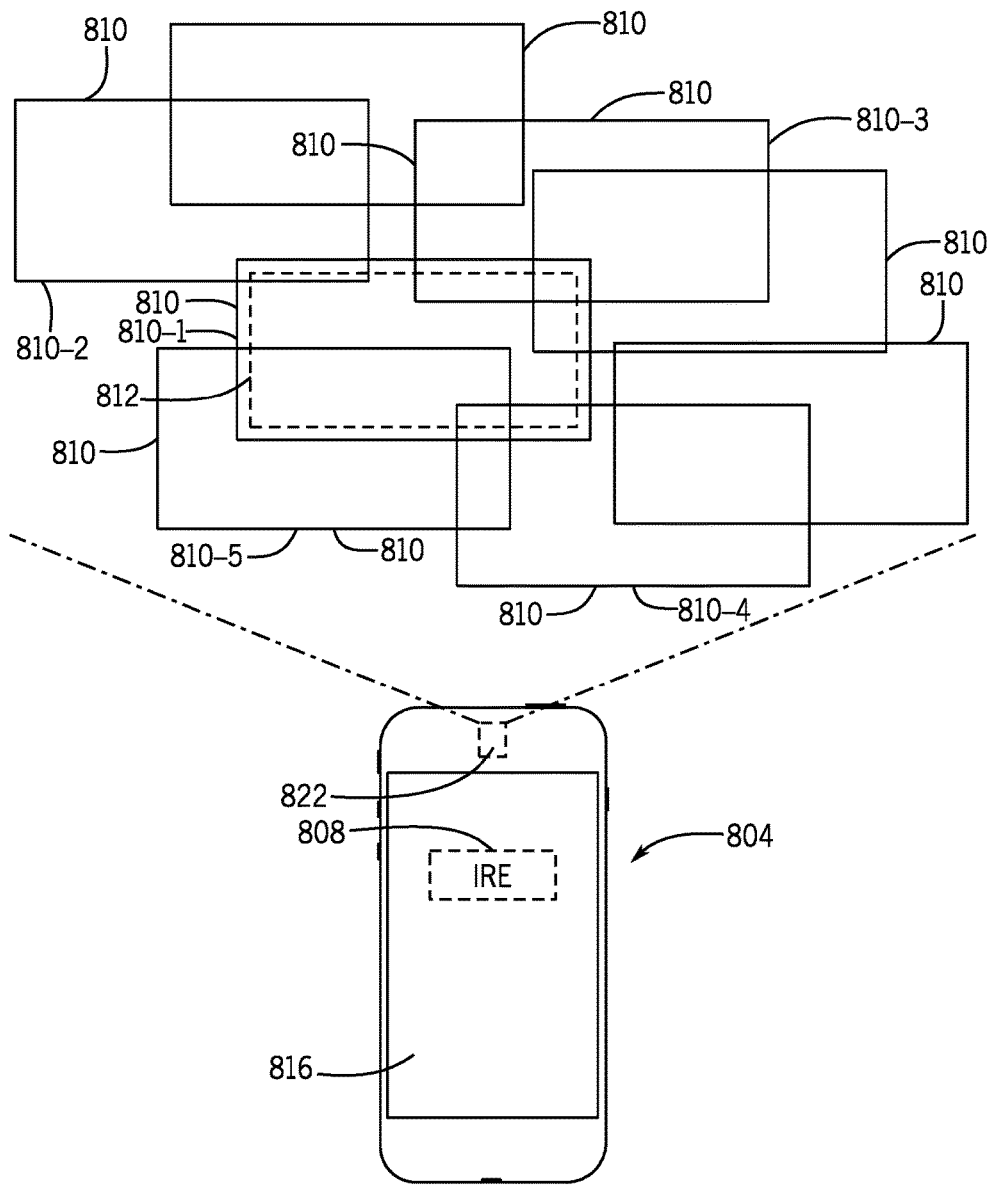
FIG. 8 is an illustration of fields of vision for imaging elements of a fixed multiple element imaging array according to an example implementation.

Referring to FIG. 8, in accordance with further implementations, a portable electronic device 804 (a smartphone, for example) may, include a fixed array 822 of cameras The cameras of the array 822 have optical axes that are oriented in different directions corresponding to overlapping fields 810 of vision. As such, an image rendering engine 808 of the electronic device 804 may process image data acquired by the cameras of the array 822 (i.e., image data representing multiple images, or snapshots captured by the array 822) for purposes of combining the image data to generate, in general, a composite image that may be derived from any part of the overall field of the area that is imaged by the array 822. As such, the image rendering engine 808 may process the image data from the array 822 to derive a snapshot from a selected part of the imaged area.

A display 816 of the electronic device 804 may, for example, display a viewfinder image that may represent all or part of a composite image derived from the images that are captured by the cameras of the imaging array 822. Through interaction with the display 816 of the electronic device 804, a user may, for example, refine the boundaries of an image to be provided by the rendering engine 808. In accordance with some implementations, the final composite image may be a panoramic image that extends in at least one dimension beyond the field of vision that is associated with the array 822, and the electronic device 804 may provide a GUI to select boundaries of the panoramic image, as described herein. Moreover, in accordance with example implementations, the electronic device 804 may provide a GUI to select a viewing angle and boundaries of an image to be provided by the rendering image 808, described herein.

In accordance with example implementations, the electronic device 804 may provide a GUI to select time sequenced positions associated with multiple images that are to be provided by the rendering engine 808, i.e., select target positions associated with a "burst" of acquired snapshots in the successive snapshot acquisition mode of operation for the electronic device. For example, the array 822 may capture composite images from the same imaged area at successive times, and the GUI may define different portions of the composite image (associated with different effective camera positions) from which the rendering engine 808 provides images corresponding to the times and positions.

In accordance with example implementations, each camera of the array 811 may acquire an image that is distorted near the boundaries of its captured image. In this manner, FIG. 8 depicts a field of vision 810-1 for a given camera of the array 822. The field of vision 810-1 has an associated non-degraded region 812, as compared to the remaining portion of the field of vision 810-1, which is associated with a degraded image. The degraded portion or portions of a captured image may be due to an optical aberration that results in a blurring in the degraded image region. Because the images from the cameras overlap, the degraded portions of these camera images may be removed to enhance the quality of the composite image that is formed from the camera images. In this manner, in accordance with example implementations, the rendering engine 808 may filter the camera images by applying a predefined spatial boundary to the image acquired by each camera for purposes of extracting an image that is assumed to be associated with the non-degraded portion of the image; and the rendering engine 808 may combine the extracted non-degraded image portions to form the composite image.

Figure 9:
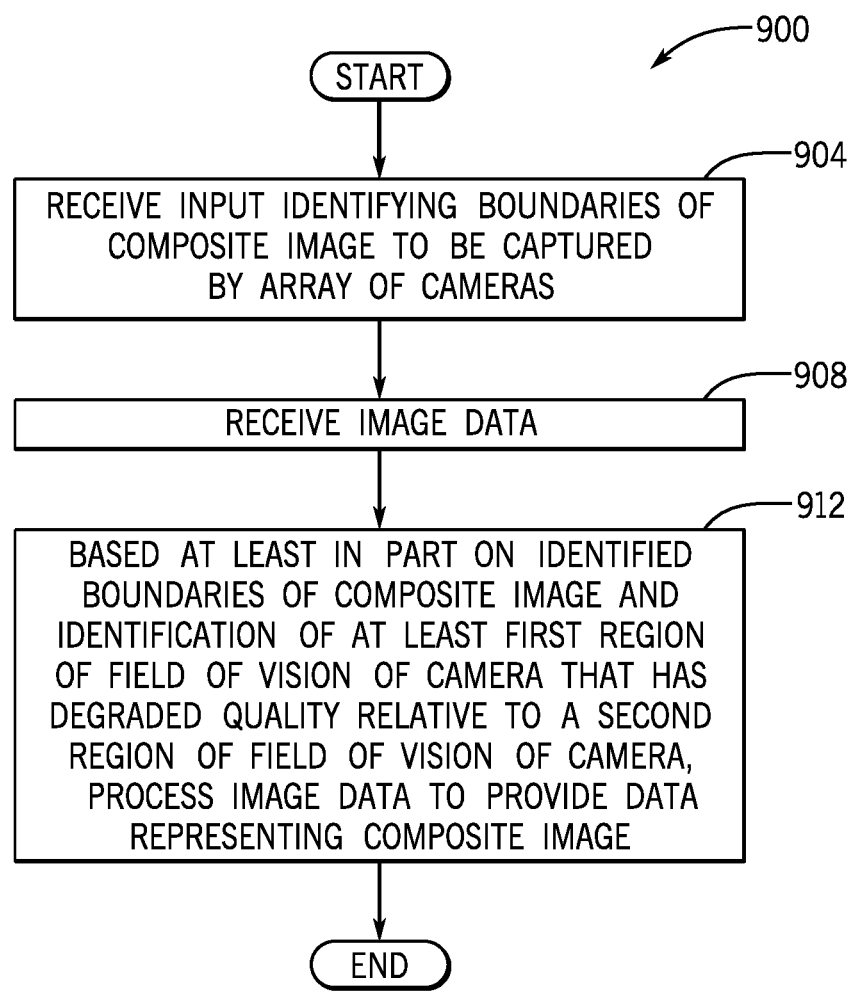
FIG. 9 is a flow diagram depicting a technique to provide data representing a composite image from image data acquired by a fixed multiple element imaging array according to an example implementation.

Thus, referring to FIG. 9 in conjunction with FIG. 8, in accordance with some implementations, the portable electronic device 804 performs a technique 900 that is depicted in FIG. 9. Pursuant to the technique 900, the electronic device 804 receives (block 904) input that identifies the boundaries of a composite image to be acquired by an array of cameras. The technique 900 includes receiving (block 908) image data acquired by the array of cameras. Each camera has an associated field of vision, at least some of the fields of vision overlap each other, and at least one field of vision of one of the cameras is associated with a first region that has a degraded quality relative to a second region of the field of vision. The technique 900 includes processing (block 912) the image data to provide data representing the composite image, based at least in part on the identified boundaries and the identification of the first region.

Figure 10:
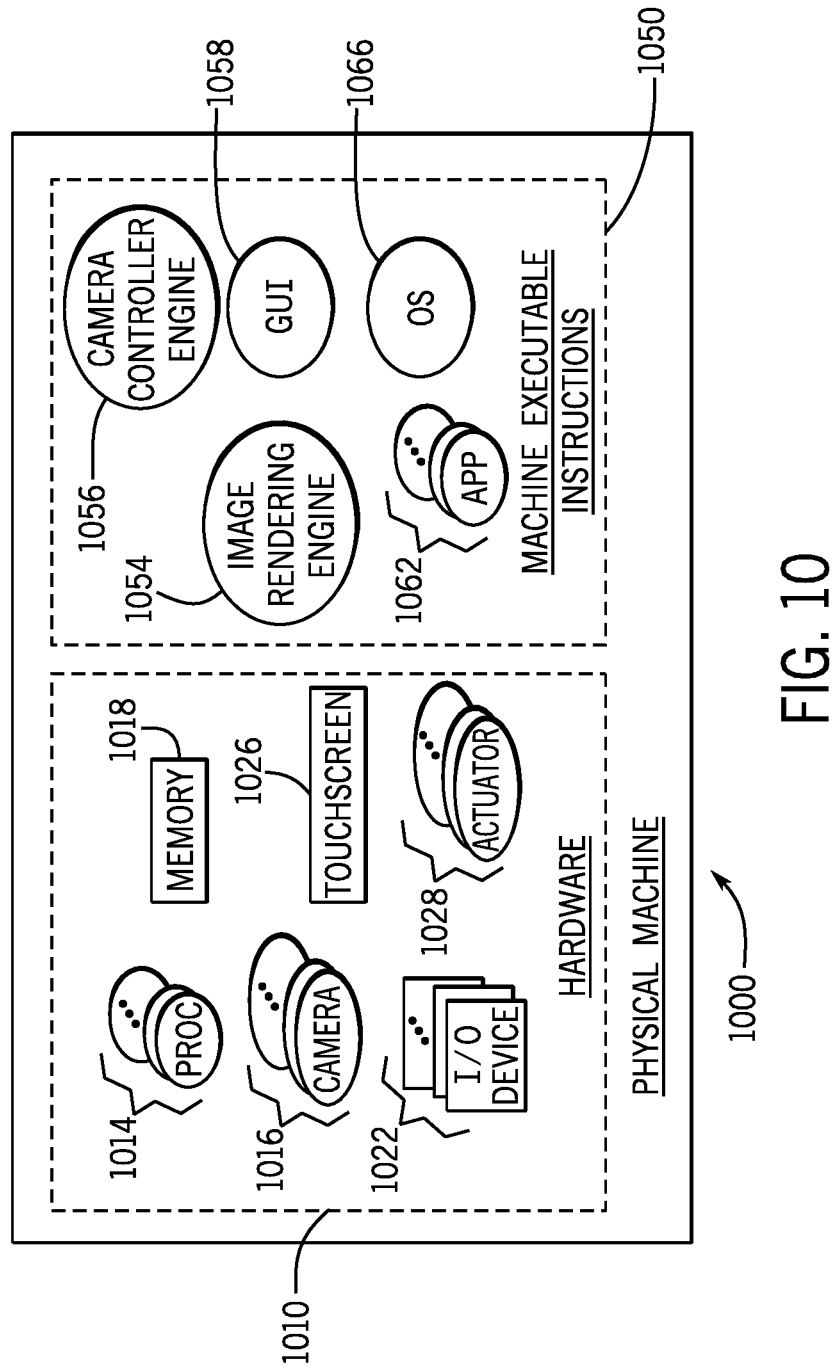
FIG. 10 is a schematic diagram of a physical machine according to an example implementation.

Referring to FIG. 10, in accordance with some implementations, the electronic devices that are described herein may be formed by one or multiple physical machines, such as physical machine 1000 that is depicted in FIG. 10. In general, the physical machine 1000 is an actual machine that is made up of hardware 1010 and machine-executable instructions (or "software" 1050.) In general, the hardware 1010 may include one or multiple cameras 1016. In this manner, the camera 1016 may be a multiple position camera and/or the hardware 1010 may include multiple cameras 1016 that are part of a fixed array of cameras. Moreover, in accordance with example implementations, the hardware 1010 may include multiple, multiple position cameras 1016. The hardware 1010 may also include one or multiple camera actuators 1028 for purpose of positioning one or multiple, multiple position cameras, as well as one or multiple mounts (not shown) for the multiple position camera(s).

The hardware 1010 may also include one or multiple processors 1014 (one or multiple central processing units (CPUs), processing cores, and so forth), which execute the machine-executable instructions 1050 for purposes of performing one or more of the techniques that are disclosed herein. In this manner, a memory 1018 of the hardware 1010 may store program instructions that when executed by one or multiple processors 1014 cause the processor(s) to control the position of a multiple position camera 110; provide one or multiple GUIs to define panoramic image boundaries, camera angles and camera positions; stitch together images to form composite images; filter degraded portions from camera-acquired images; and so forth.

The memory 1018, in general, is a non-transitory storage medium that may store, as examples, data acquired by the camera; machine-executable instructions that are executed by the processor(s) 1014; data representing a panoramic snapshot or image; data representing multiple images captured by an array of fixed position cameras; data representing multiple images captured by a multiple position camera at different positions of the camera; and so forth. The memory 1018 may be formed from semiconductor storage devices, memristors, magnetic storage devices, phase change memory devices, a combination of one or more of these storage technologies and so forth, depending on the particular implementation.

In accordance with example implementations, the machine-executable instructions 1050 may include instructions 1059, that when executed by the processor(s) 1014 cause the processor(s) 1014 to form a camera controller engine 1056 to interact with a camera actuator to control a multiple position camera, as described herein Moreover, the machine-executable instructions 1050 may include instructions 1058 that when executed by the processor(s) 1014 cause the processor(s) 1014 to display a GUI for purposes of receiving user input defining camera positions, image boundaries; panoramic image boundaries, and so forth. The machine-executable instructions 1050 may further include instructions 1058 that when executed by the processor(s) 1014 may cause the processor(s) 1014 to render images acquired by the camera, such as stitching together multiple images to form a panoramic snapshot, combining images to remove degraded image portions, and so forth. Moreover, the machine-executable instructions 1050 when executed by the processor(s) 1014 may cause the processor(s) 1014 to provide many other components, such as instructions 1062 to form one or multiple applications, instructions 1066 to form an operating system 1066, and so forth.

In accordance with further example implementations, all or part of the above-described processor-based components may be replaced by a dedicated, hardwired circuitry or by one or multiple application specific integrated circuits (ASICs).

Other implementations are contemplated, which are within the scope of the appended claims. For example, for example implementations that are described herein, the electronic device may contain a visual display may be used for such purposes as selecting boundaries of a panoramic image to be captured, selecting target positions for the successive snapshot mode of acquisition, selecting the viewing angle, and so forth. However, in accordance with further example implementations, the electronic device that contains a multiple position camera may not contain a visual display. In this manner, parameters for the particular capture of one or multiple snapshots or images by the electronic device may be provided using input and/or output devices for the electronic device, other than visual display-based devices. For example, an electronic device that contains a multiple position camera may be a wearable device, such as a watch, and the user may select parameters for image capture using one or multiple buttons of the watch. As another example, an electronic device that contains a multiple position camera may be an unmanned aircraft, or drone, and the user may select one or more image capturing parameters by wirelessly communicating with the drone (on which the camera is mounted) through another device (a handheld smartphone or laptop, for example).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:
1. An electronic device comprising:
an input device to receive an input to identify boundaries of a scene, wherein the identified boundaries correspond to boundaries of a panoramic image, the panoramic image has an associated first field of vision, and the boundaries comprise a first boundary and a second boundary;
a multiple position camera having an optical axis and having an associated second field of vision less than the first field of vision, wherein the camera to acquire sub-images of the panoramic image, and the sub-images correspond to different parts of the scene; and
an actuator to move the camera based on the input to pan the optical axis of the camera across the scene to acquire the sub-images, wherein the panning of the camera comprises moving the camera such that the optical axis of the camera moves from a first position at which the camera acquires a first sub-image of the sub-images coinciding with the first boundary to a second position at which the camera acquires a second sub-image of the sub-images coinciding with the second boundary.

2. The electronic device of claim 1, further comprising:
a controller to control the actuator to move the camera based at least in part on the input; and
a processor-based engine to combine data associated with the plurality of images to form the panoramic image.

3. The electronic device of claim 1, further comprising:
a housing; and
a mount to hold the camera and allow the camera to pivot about at least one axis relative to the housing to acquire the sub-images.

4. The electronic device of claim 3, wherein the mount comprises a socket or a gimbal.

5. The electronic device of claim 1, wherein the input device comprises a touch screen to display a viewfinder image acquired by the camera and receive a touch-based input to select the boundaries.

6. The electronic device of claim 1, wherein the actuator comprises a motor, an electromagnet or an electroactive polymer.

7. The electronic device of claim 1, wherein the input further identifies a pattern of time sequenced locations to acquire the sub-images.

8. The electronic device of claim 1, further comprising:
a telephony device; and
a housing to contain the camera, the actuator, the input device and the telephony device,
wherein the input device comprises a touch screen to acquire the input.

9. The electronic device of claim 8, wherein the camera has an orientation to face a viewer of the touch screen or an orientation to face away from the viewer of the touch screen.

10. The electronic device of claim 1, wherein the actuator moves the camera such that the sub-images completely cover the scene.

11. An article comprising a non-transitory computer readable storage medium to store instructions that when executed by a computer cause the computer to:
receive an input to identify boundaries of a scene, wherein the identified boundaries correspond to boundaries of a panoramic image to be acquired using a multiple position camera, the panoramic image has an associated first field of vision, the boundaries comprise a first boundary and a second boundary, the camera has an optical axis and has an associated second field of vision less than the first field of vision, the camera to acquire sub-images of the panoramic image, and the sub-images correspond to different parts of the scene; and
control an actuator to move the camera based on the input to pan the optical axis of the camera across the scene to acquire the sub-images, wherein the panning of the camera comprises moving the camera such that the optical axis of the camera moves from a first position at which the camera acquires a first sub-image of the sub-images coinciding with the first boundary to a second position at which the camera acquires a second sub-image of the sub-images coinciding with the second boundary.

12. The article of claim 11, wherein:
the computer comprises a housing;
the computer comprises a touch screen; and
the storage medium to store instructions that when executed by the computer cause the computer to receive the input in response to physical interaction with the touch screen.

13. The article of claim 11, wherein the storage medium to store instructions that when executed by the computer cause the computer to change a viewing angle associated with the panoramic image in response to the input.

14. The article of claim 11, wherein the storage medium to store instructions that when executed by the computer cause the computer to provide a graphic user interface on a display of the computer to allow entry of the input representing the boundaries in response to a viewfinder image being displayed on the display.

15. A method comprising:
in response to an input, identifying boundaries of a scene, wherein the identified boundaries correspond to boundaries of a panoramic image, the panoramic image has an associated first field of vision, and the boundaries comprise a first boundary and a second boundary;
moving a multiple position camera to acquire data representing sub-images of the panoramic image, wherein the camera has an optical axis and has an associated second field of vision less than the first field of vision, the sub-images correspond to different parts of the scene, moving the camera comprises moving the camera based on the input to pan the optical axis of the camera across the scene to acquire the sub-images, and the panning of the camera comprises moving the camera such that the optical axis of the camera moves from a first position at which the camera acquires a first sub-image of the sub-images coinciding with the first boundary to a second position at which the camera acquires a second sub-image of the sub-images coinciding with the second boundary; and
processing the acquired data to construct the panoramic image.

16. The method of claim 15, wherein moving the camera comprises moving the camera such that the sub-images completely cover the scene.

17. The method of claim 15, wherein processing the acquired data comprises stitching the sub-images together to form the panoramic image.

18. The method of claim 15, further comprising:
identifying a pattern of time sequenced locations to acquire the sub-images, wherein moving the camera comprises moving the camera such that the optical axis of the camera moves to each location of the pattern of time sequenced locations.

19. The method of claim 15, wherein moving the camera further comprises moving the camera about a socket or a gimbal.

20. The method of claim 15, wherein moving the camera further comprises moving.

* * * * *